UNITED STATES PATENT OFFICE.

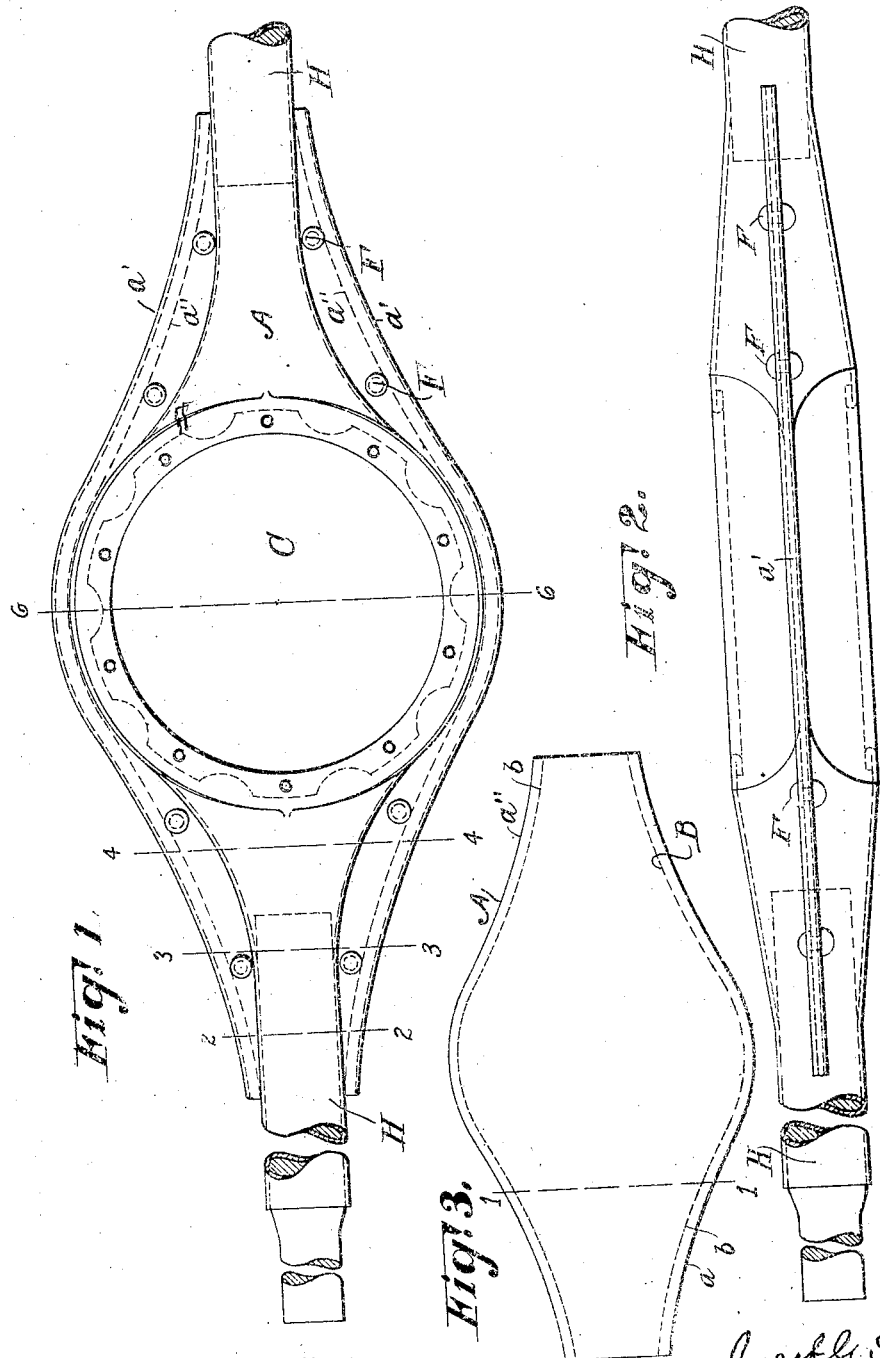

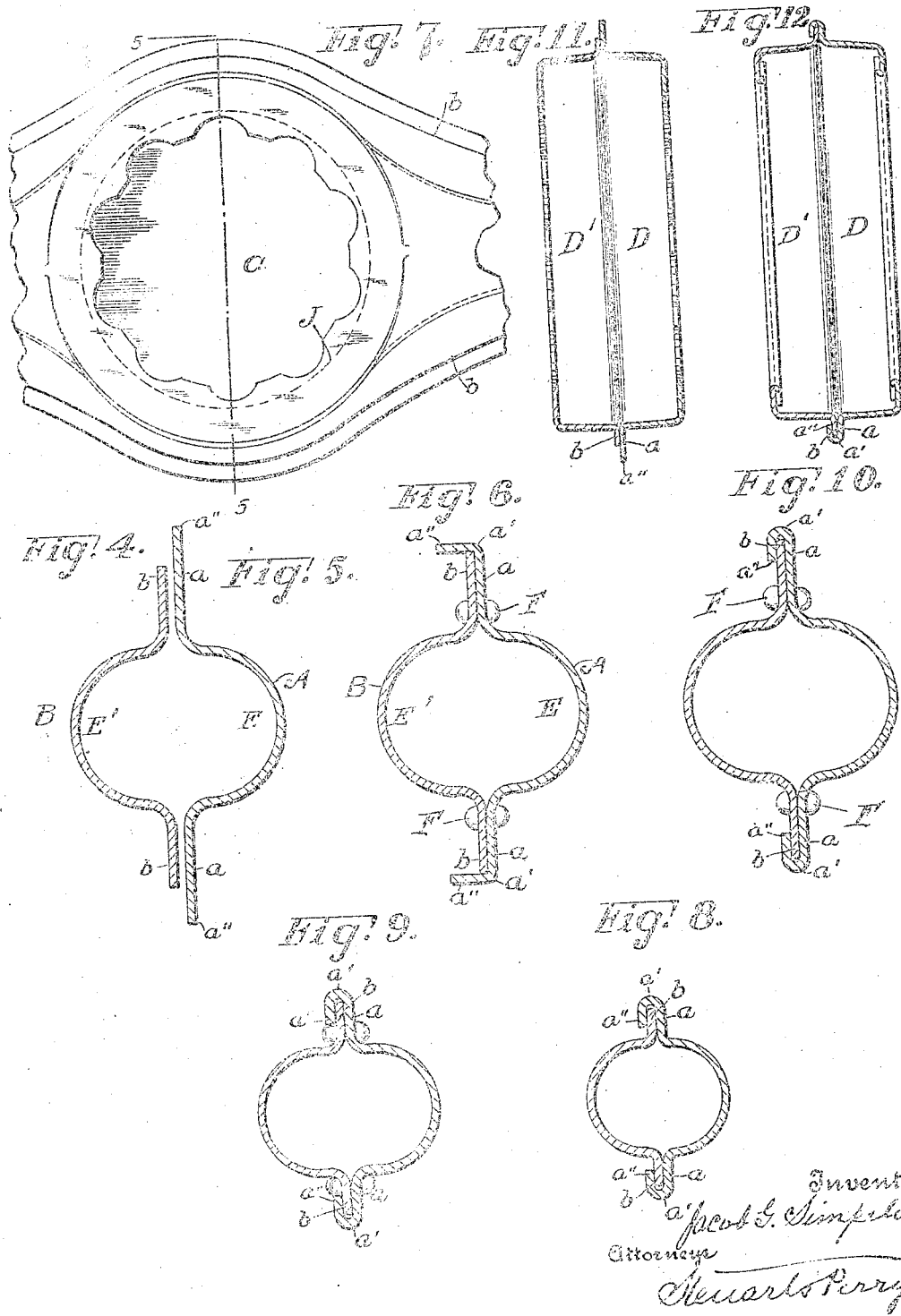

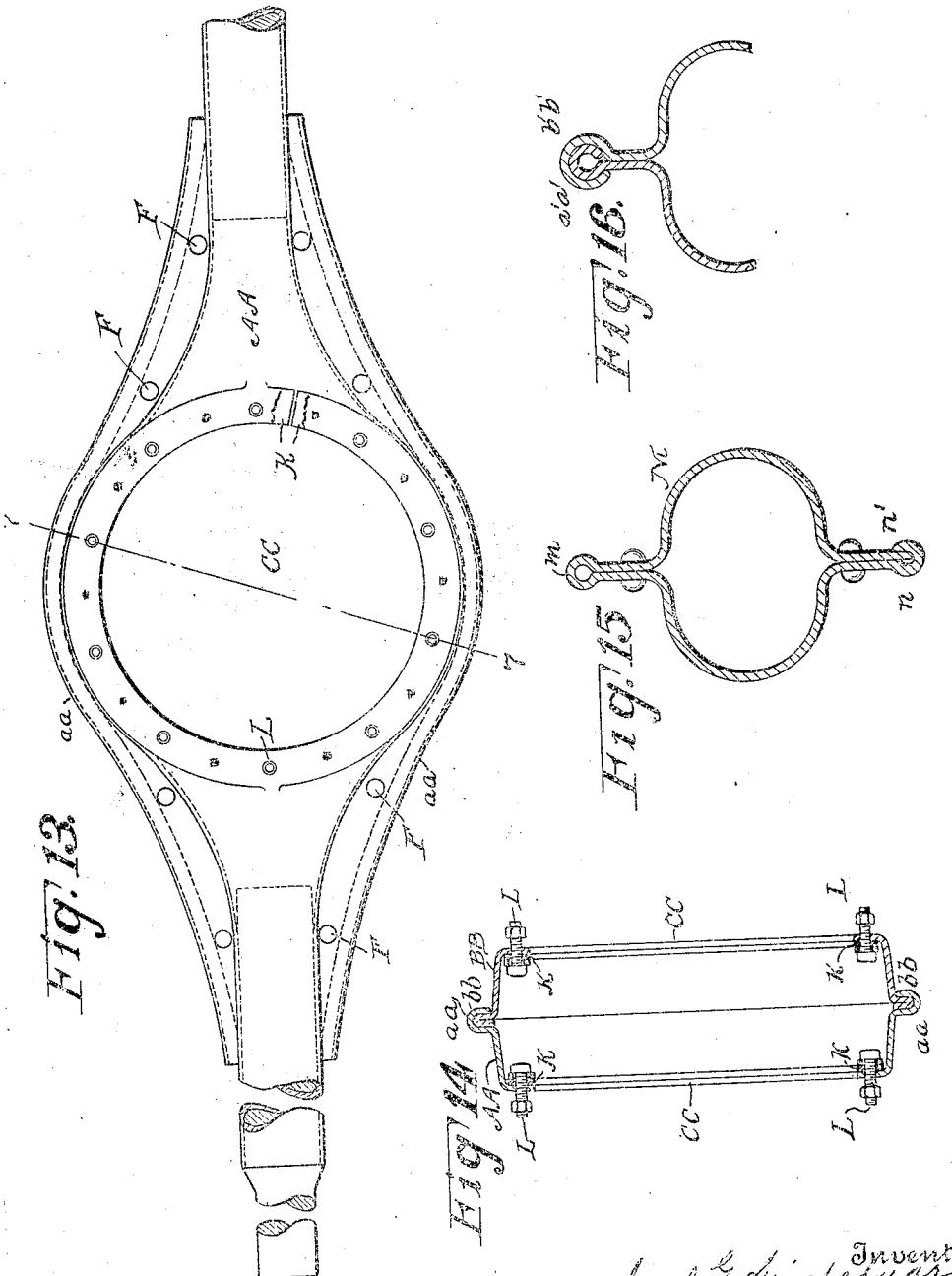

JACOB G. SIMPELAAR, OF MILWAUKEE, WISCONSIN, ASSIGNOR, BY MESNE ASSIGNMENTS, TO THE STUDEBAKER CORPORATION, OF DETROIT, MICHIGAN, A CORPORATION.

REAR-AXLE HOUSING.

1,295,221.  Specification of Letters Patent.  Patented Feb. 25, 1919.

Application filed November 19, 1913. Serial No. 801,798.

*To all whom it may concern:*

Be it known that I, JACOB G. SIMPELAAR, a citizen of the United States, residing at Milwaukee, county of Milwaukee, and State of Wisconsin, have invented new and useful Improvements in Rear-Axle Housings, of which the following is a specification.

My invention relates to improvements in rear axle housings.

The object of my invention is to provide a form of integrally trussed rear axle housing which may be made from sheet metal in a series of simple and inexpensive cutting, pressing and folding operations, whereby the use of auxiliary truss rods or stays may be dispensed with and a superior structure of great strength and rigidity, and at the same time having large road clearance, may be produced, and whereby brazing and riveting may be largely dispensed with.

The invention, in its broad aspect, embodies two complementary plates secured together to form a housing, each of which plates is dished or depressed at substantially its central portion, whereby a chamber is formed for housing differential mechanism, and each of which plates is channeled longitudinally to form elongated chambers extending laterally from the differential chamber and adapted to house the axle shafts associated with said differential. Relatively deep webs are formed along those portions of the plates adjacent the axle shaft chambers to shape the housing into the form of a truss, and it is to these relatively deep webs that the present invention is particularly directed. The invention provides said relatively deep webs in face-abutting relation, and the two housing sections or plates are secured together along the outer edges of said webs, preferably by beading the edge of one plate over the edge of the other plate.

I am aware that automobile axle housings have been heretofore proposed in which two pressed metal halves were riveted or welded together in planes both horizontal and vertical, but I am not aware that any axle housing has heretofore been conceived wherein two pressed metal halves were secured together by means of a joint made in substantially a vertical plane and so formed that adjacent flanges produced integral trusses in which a body of metal of greater breadth than the web formed by the adjacent flanges was placed at the extremity of the web, so as effectively to prevent side buckling of the upper web under compression, and so as to secure greater strength for the volume and weight of the metal used than if the web afforded by the flanges were not, at its extremity, reinforced in the manner described. Neither am I aware that housings have been heretofore conceived wherein portions of the housing were bent into a substantial rod to withstand the stress tending to produce linear fracture along the lower side of the housing and to prevent the presentation of a thin edge of metal to the tearing tendencies of the stresses resulting from the use of the housing. Moreover, I am not aware that axle housings have ever been made which embodied a plurality of sections riveted, beaded or welded together, comprising the relatively deep webs hereinbefore specified so positioned that the adjacent faces were in abutting contact or engagement throughout substantially their entire extent. This construction is such as to be extremely strong and withstands great strains without buckling.

In the preferred embodiment of my invention, hereinafter described in detail, the abutting flanges at the lower side of the housing are conformed and disposed in the same manner as are the upper flanges; however, in order that satisfactory results may be obtained, it is necessary that only the upper flanges be conformed to afford a relatively deep web provided at its edge with a body of metal that is of greater cross section than the thickness of two flanges, or, in other words, a truss of substantially I-beam construction. The lower web is a tensile truss element, and, when provided with the beaded-over edge, the bead thus formed provides a substantially rod-like construction which insures the edges of the web against linear fracture. With this explanation, I shall, for the purpose of making clear the functions of the several flanges, and webs which they form, refer to the structure afforded by the upper beaded flanges as a truss of substantially I-beam construction, and the structure afforded by the lower beaded flanges as a substantial rod.

Features of the invention, other than those specified, as well as the advantages thereof, will be apparent from the hereinafter detailed description taken in conjunction with the accompanying drawings.

In the accompanying drawings I have illustrated different practical embodiments of the invention, but the constructions therein shown are to be understood as illustrative, only, and not as defining the limits of the invention.

Figure 1 is a rear view of a rear axle housing embodying my invention.

Fig. 2 is a plan view of the same.

Fig. 3 is a plan view, on a small scale, of one of the blanks from which the housing is formed, with dotted lines indicating the dimensions of the counterpart blank.

Figs. 4 and 5 are sectional views of the respective blanks drawn on line 1—1 of Fig. 3, but showing the blanks as they appear after the first compressing operation has shaped the blanks into two concavely hollowed members.

Fig. 6 is a sectional view on the same plane, showing the larger member with its marginal portion partially folded preparatory to the assembling operation.

Fig. 7 is a view of the inner face of the larger member as it appears preparatory to the operation of folding in the margins about the central aperture.

Figs. 8, 9, 10, 11 and 12 are sectional views showing the members assembled and margins wholly folded, said views being drawn on lines 2—2, 3—3, 4—4, 5—5, and 6—6, respectively, of Figs. 1 and 7.

Fig. 13 is a rear view of a housing embodying a modified form of my invention.

Fig. 14 is a sectional view drawn on line 7—7 of Fig. 13.

Fig. 15 is a view in cross-section of a further modification, and

Fig. 16 is a detail sectional view of slightly modified form of the construction shown in Fig. 14.

Like parts are identified by the same reference characters throughout the several views.

It will be understood that a rear axle housing of the type herein referred to is provided with a central cavity for the differential gears, and has openings to the front and rear, the front aperture receiving the transmission shaft and the rear one affording access to the gearing. These apertures are normally closed, an ordinary cap (not shown) being used at the rear and the transmission shaft casing (also not shown) being secured to the housing wall at the front.

In forming the housing shown in Fig. 1, I first cut a set of blanks A and B from sheet metal. These blanks are similar in contour, being widest in the central portion and tapering along curved lines toward the respective ends, the end portions having straight and substantially parallel margins. Each blank is cut out centrally to form a central aperture C, preferably having a scalloped margin to facilitate the inwardly folding operation hereinafter described. The blank A is wider than the blank B, the difference in width being sufficient to allow the side margins of the blank A to fold over the margins of the blank B. The aperture C in one blank is provided as a handhole to render the mechanism adapted to be positioned within the housing accessible from the exterior thereof, while the aperture C in the other blank provides an opening in the wall of the housing through which the driving connections may extend.

After cutting the blanks as above described, they are each pressed in a suitable die to form central cup-shaped cavities D D' (Fig. 11), which are extended in the form of tapering depressions E E' (Figs. 4 and 5) toward the respective ends of the blanks, these depressions progressively approaching a semi-cylindrical form at the respective ends, as will appear from a comparison of Figs. 8, 9, 10 and 11, and as also appears in Figs. 1 and 2. The pressing operation above referred to provides two half members having projecting margins in the form of flanges, $a$ and $b$, respectively, the flanges $a$ of the blank or member A being wider than the flanges $b$ of the blank B, and the members A and B being otherwise preferably of substantially equal size.

It will be observed in Fig. 6, which shows the members A and B assembled, that the outer portions of the flanges $a$ of the member A are partially folded at $a'$, parts $a''$ of these flanges extending at right angles to the other parts. The inner parts of these flanges are of sufficient dimensions to receive the flanges $b$ of the member B when parts are assembled as shown in Fig. 6.

When the parts are thus assembled, with flanges $a'$ and $a''$ in face-abutting contact, they are connected together at points intermediate the ends and central portions by rivets F, after which the upturned parts $a''$ of the flanges $a$ are completely folded over upon the edges of the flanges $b$, as clearly shown in Figs. 8 to 12, inclusive. During this final pressing operation, the members are rigidly held together by pressure applied in the vicinity of the rivets F, and sufficient pressure is exerted upon the folded portions of the flanges $a''$ to secure a rigid union of the parts, thus forming the completed housing body. The housing body thus formed is provided with ribs following the contour thereof substantially along the longitudinal central plane and constitutes a truss, of which the folds or ribs comprise the upper and lower members connected together by the side walls of the housing which serve as relatively deep connecting webs continuously united to the truss rods throughout their length. The fact that the truss rods so formed converge along the curved contour lines of the casing, is also important as lending strength to the entire structure.

Tubular members H may then be inserted in the cylindrical end portions of the housing body, as illustrated in Figs. 1 and 2, the members H being preferably brazed or welded to the cylindrical end portions of the body. These tubes H are adapted to receive the axle shafts, which extend through them to the differential gearing located in the central cavity or differential chamber. These, however, are not essential, as the integral tubular portions of the housing may be extended to any desired length.

Preparatory to assembling the members A and B as above described, the margins of the central apertures C may be folded inwardly as shown in Fig. 2, the folding taking place along the dotted circular line J appearing in Fig. 7. The scalloped edges of these margins permit the necessary expansion at the edges during this folding operation. This operation may take place either prior to the partial folding of the flange $a$, as indicated in Fig. 6, or subsequent thereto. The partial folding of said flange $a$ may also take place simultaneously with the pressing operation by which the cavities D D' and E E' are formed. The object of folding the margins of the apertures C as above described is to strengthen the members and provide additional body at the points where the cap and transmission shaft casing are to be applied.

It will be observed that, with the exception of the tubular end portions H, the housing is entirely formed by a series of stamping, folding and pressing operations whereby the blanks are cut from sheet metal and, after being shaped, are connected with each other by folded interlocking truss members in a central vertical plane. The folded and lapped joints add materially to the strength of the structure, since they form substantial, integral truss rods extending along the outer edges of the webs of the housing at the bottom and substantially I-beam integral compression trusses extending along the outer surfaces of the housing at the top. These ribs converge toward the respective ends, and they, therefore, not only serve as integral truss rods, but securely lock the respective members together against both longitudinal and lateral movement. By employing dies in connection with suitable folding and pressing machinery, an absolutely rigid connection can be secured without brazing or welding, and even without riveting, although the rivets F are preferably inserted. Said rivets F aid in holding the parts together, with the relatively deep flanges in face-abutting contact, after the housing is completed, and also aid materially in holding members A and B together during the final folding operation performed upon the flanges $a''$, whereby the edges thereof are lapped over the edges of flanges $b$ of the member B.

In Figs. 13 and 14, the flanges $b\ b$ of the member B B correspond to the flanges $b$ in Figs. 1 to 12, inclusive, but are folded to form a double rib member over which the outer member $a\ a$ of the member A A is formed, as best shown in Fig. 14. In this form of construction, the blanks may be of substantially the same size, and the flanges $b\ b$ may be folded preparatory to the assembling operation. In Figs. 13 and 14, the margins of the apertures C C are not shown as folded, but an independently formed annulus K (preferably a split ring) is applied to the inner face of the aperture margin and point-welded thereto to facilitate handling and partially secure the parts. Bolts L (preferably threaded in each annulus K and margin C C with the heads within the housing) are adapted to not only hold the parts together but to also connect the cap and transmission shaft housings to the front and rear walls, respectively.

In Fig. 15 I have shown, in cross-section, a webbed housing formed integrally from a single blank M, which, if desired, may be folded at $m$ to form a cylindrical rib on one side, and which has interlocking flanges on the other side, one flange $n$ being preferably wider than the other flange $n'$ and also folded over the latter in the form of a cylindrical rib positioned along the edge of the intermediate, relatively deep web.

In Fig. 16, flanges $a'\ a'$ and $b'\ b'$ are shown in interlocking relation and each folded in the form of a cylindrical rib. The features shown in Figs. 13 to 16, inclusive, may be used interchangeably in any housing. They are illustrated to show that the truss ribs, which extend along the edges of the relatively deep webs, may be made in any desired form and of any desired strength and weight, even through comparatively light sheet metal may be used to form the housing proper, In fact, by increasing the folds in size or number, and thereby increasing the amount of metal in them, the weight of material in the side walls may be correspondingly reduced without impairing the strength and durability of the housing.

Owing to the fact that rear axle housings are not only required to protect the differential gearing and driving axles of motor driven vehicles, but are also required to support the weight of the vehicle body from the wheels, it is exceedingly important that a housing formed of sheet metal shall be so reinforced and strengthened as to enable it to withstand the strains to which such housings are subjected and to carry the required load. By having the interlocking seams reversely arched in the central portions and connected with each other integrally by the sheet metal webs, which constitute the walls of the housing, it is possible to provide a structure of far greater strength in proportion to the weight than any of the axle housings heretofore constructed. I believe that I am the first to conceive of the fact that a sheet metal interlocking seam, when arched and arranged as above described, may be utilized to not only unite the sections of the housing, but, also, to form a truss for the housing, which greatly adds to the strength thereof. Moreover, I am the first to provide a housing with the relatively deep webs specified, the webs being formed by relatively deep flanges which are positioned in direct face-abutting contact throughout substantially their entire extent, and the edges of which are secured together by beading, or otherwise.

It will thus appear that, in all of the embodiments of the invention described, the vehicle axle of this invention embodies two complementary plates which are so shaped as to form central, dished portions to house a differential, and laterally extending, substantially semi-cylindrical portions to house a wheel driving shaft. Each of these plates is provided at both of its edges with relatively deep flanges tapering toward the center and ends of the plates, so that, when said plates are positioned in face-abutting relation and secured together along their free edges, preferably by bending a portion of one plate over the edge of the other, an axle will be formed provided with a chamber for containing the differential, and substantially cylindrical passages through which the wheel driving shafts extend, while intermediate said passages and the edges of said axle will be positioned relatively deep webs. If the edges of the plates are secured together by beading one plate over the edge of the other, as described, the said relatively deep webs will be positioned intermediate the beaded-over portion and the substantially cylindrical portions of the structure. Thus, the invention may be said to embody, in its broad aspect, two complementary plates secured together to form a casing, each of which plates is dished or depressed at substantially its central portion whereby a chamber is formed for housing the differential, and each of which plates is channeled longitudinally to form elongated chambers extending from the differential chamber to house the axle shafts. The relatively deep webs are formed along those portions of the plates adjacent the axle shaft chambers to shape the axle into the form of a truss.

A salient feature of the invention resides in the fact that the web portions of the structure are in face-abutting relation, i. e., are in face-abutting contact, so that the inner faces of the webs of one plate actually contact with the inner faces of the corresponding webs of the other plate. By this construction, a very strong and rigid axle results.

While it is desired to bead over the edges of the plates, as described, it will be apparent that a very strong structure would result through the employment of the webs even though the edges of the plates were riveted or welded together, rather than beaded over as specified. It will, of course, be understood that, if the edges of the plates are riveted or welded together, in lieu of the beaded-over construction, both plates may be initially stamped the same size, the extra width of one of the plates, to allow of the beading over, being unnecessary. The salient features of the invention are the relatively deep, face-abutting flanges and the beading of said flanges to produce longitudinal ribs along the edges thereof.

The showing made in the accompanying drawings and hereinbefore described illustrates the preferred constructions employed, although it will be understood that the invention is not limited to these specific details, but is as broadly novel as is commensurate with the appended claims.

Having thus fully described the invention, what I claim as new, and desire to secure by Letters Patent, is:

1. A rear axle housing for automobiles comprising a pair of sheet metal halves each pressed to form a dished central portion and semi-cylindrical axle inclosing extensions projecting laterally therefrom and web portions extending in a substantially vertical plane both upwardly and downwardly from the margins of said dished and semi-cylindrical portions, the extended web portions of one of said halves being beaded over the edges of the web portions of the other of said halves to fasten the halves together and to form an integral compression truss above the hollow portion of the housing and an integral thickened and rounded tensile truss below the hollow portion of the housing, the web formed by adjacent flanges of the two halves of the housing being of varying width so that the thickened marginal portions of the trusses are effectively spaced from the hollow portion of the housing.

2. An axle housing for automobiles comprising a pair of sheet metal halves each pressed to form a dished central portion and dished axle inclosing extensions projecting laterally therefrom and flat web portions extending upwardly and downwardly from the edges of the dished portions of each of the halves, the extended flat web portions of one of said halves being beaded over the edges of the web portions of the other of said halves to secure the halves together in continuous upper and lower joints, the beaded over portions being so spaced from the dished portions of the housing by the varying width of said flat web portions as to constitute upper and lower integral truss members, the beaded over portion above the dished portion of the housing serving to prevent lateral deflection of the web under compression and the beaded over portion below the dished portions of the housing serving to prevent tearing of the metal under tension.

3. An automobile axle housing comprising front and rear pressed metal plates of substantially equal thickness, the margins of one of said plates being beaded over the margins of the other of said plates in a substantially vertical plane so as to form continuous joints between the plates and so as to constitute integral truss members for the support of the central part of said housing, the folded over portions of one housing half being lapped back upon the outer face of the adjacent portions of the other housing half so that a substantial quantity of metal having three times the thickness of the metal constituting each half of the housing will be spaced from the hollow portion of the housing by a web comprising two thicknesses of the metal constituting each half of the housing.

4. A vehicle axle embodying two complementary plates adapted to be secured together to form a casing, each of said plates being dished or depressed at substantially its central portion whereby a chamber is formed for housing the differential, and each of said plates being channeled longitudinally to form elongated chambers extending from the differential chamber to house the axle shafts, relatively deep webs formed along those portions of the plates laterally adjacent the axle shaft chambers, each of said webs tapering in depth longitudinally toward the differential chamber and toward the end of the axle for shaping the axle into the form of a truss, portions of the plates being laterally extended beyond the differential chamber and the webs to allow of the fastening of the plates together, and means coöperating with said extended portions for securing the plates in complementary relation, with the corresponding webs of the two plates in face-engaging contact with one another throughout substantially their entire extent.

5. A vehicle axle embodying two complementary plates adapted to be secured together to form a casing, each of said plates being dished or depressed at substantially its central portion whereby a chamber is formed for housing the differential, and each of said plates being channeled longitudinally to form elongated chambers extending from the differential chamber to house the axle shafts, relatively deep webs formed along those portions of the plates laterally adjacent the axle shaft chambers, for forming the axle into a truss, portions of the plates being extended beyond the webs to allow of the fastening of the plates together, and means coöperating with said extended portions for securing the plates in complementary relation, with the corresponding webs of the two plates in face-engaging contact with one another throughout substantially their entire extent, and additional means for insuring the face-engaging contact between each complementary pair of webs.

6. A motor vehicle axle embodying two complementary plates, portions adjacent the longitudinal edges of which are united and which plates are so shaped as to form a casing for a differential and the axle shaft, each of said plates being provided at both sides thereof with a deep, laterally extending web intermediate the united portions of the plates and those portions thereof which house the axle, and the complementary webs of the plates, on both sides of the differential, being in face-abutting contact throughout substantially their entire extent, and means for securing said webs together whereby a substantially rigid truss member is formed.

7. A motor vehicle axle embodying two complementary plates united at their longitudinal edges and so shaped as to embody a casing for a differential and the axle shaft, each of said plates being provided at both sides thereof with a deep, laterally extending web intermediate the edges of the plates and those portions which house the axle, said webs tapering toward their ends and the complementary webs of the plates, on either side of the differential, being in face-abutting contact so as to form a substantially rigid truss member, and means passing through each complementary pair of webs for maintaining them in contact.

8. A motor vehicle axle embodying two complementary plates united at their longitudinal edges by bending the edge of one of said plates over the edge of the other plate to form a retaining flange and so shaped as to embody a casing for a differential and the axle shaft, each of said plates being provided at both sides thereof with a deep, laterally extending web intermediate the edges of the plates and those portions which house the axle, the complentary webs of the plates, on either side of the differential, being in face-abutting contact for substantially their entire extent so as to form a substantially rigid truss member.

9. A vehicle axle embodying two complementary plates adapted to be secured together to form a casing, each of said plates being dished or depressed at substantially its central portion whereby a chamber is formed for housing the differential, and each of said plates being channeled longitudinally to form elongated chambers extending from the differential chamber to house the axle shafts, relatively deep webs formed along those portions of the plates laterally adjacent the axle shaft chambers for forming the axle into a truss, a bead formed around a hand-hole in the differential casing, which bead serves as a strut for the truss, and means for securing the plates in complementary relation.

In testimony whereof I affix my signature in the presence of two witnesses.

JACOB G. SIMPELAAR.

Witnesses:
 CHAS. BOLL,
 R. S. SMITH.